Nov. 22, 1966     Z. J. LANSKY ETAL     3,286,978

LOCKING DEVICE

Filed April 2, 1964

INVENTORS.
ZDENEK J. LANSKY
BY KENNETH A. BRACKI

Oberlin, Maky & Donnelly
attorneys

3,286,978
Patented Nov. 22, 1966

3,286,978
LOCKING DEVICE
Zdenek J. Lansky, Winnetka, and Kenneth A. Bracki, Mount Prospect, Ill., assignors to Parker-Hannifin Corporation, Cleveland, Ohio, a corporation of Ohio
Filed Apr. 2, 1964, Ser. No. 356,858
11 Claims. (Cl. 251—112)

The present invention relates generally as indicated to a locking device, and more particularly to a locking device for a screw threaded valve member.

In the case of precision metering valves it is known to provide a screw threaded valve member which has threaded engagement with the valve body, whereby turning of the valve member in opposite directions increases or decreases the size of a metering orifice defined between the valve member and the valve body. In such constructions the valve member has threaded engagement with the valve body and is usually locked in preset axial position by means of a lock nut threaded onto said member and adapted to frictionally engage the valve body but, as apparent, the tightening of the lock nut will disturb the axial setting of the valve member owing to clearances in the threads. Moreover, in such known constructions it is necessary, while tightening the lock nut, to hold the valve member against turning, since any such turning of the valve member would disturb the axial setting thereof.

In view of the foregoing, it is an object of this invention to provide a novel locking device in which the threaded member, that is, the valve member, has an axially slidable telescopic fit in the valve body and threaded engagement only with a nut, the nut being nonrotatably and axially retained with respect to the valve body by means of a lock screw which has the further function of urging the nut and valve member laterally of the valve body, thus to lock the valve member against turning from preset position without disturbing the axial preset position thereof in the valve body.

Another object of this invention is to provide a locking device of the character indicated in which spring means interposed between the valve body and the nut is effective to take up clearance between the lock screw and the nut and body so that the nut will be yieldably retained in a predetermined position with respect to the body whether the lock screw is in unlocking or locking position.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

Figure 2:
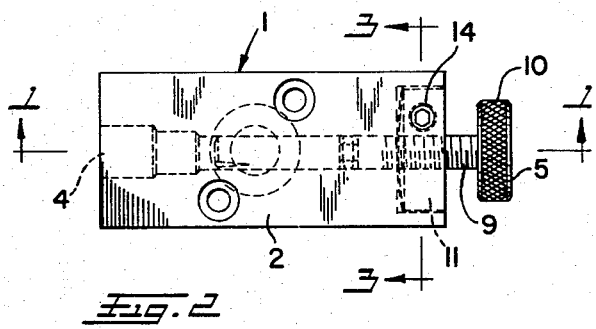
FIG. 2 is a top plan view as viewed from line 2—2, FIG. 1.

Referring now more particularly to the drawing, the metering valve 1 shown for purposes of illustration comprises a valve body 2 provided with a longitudinal bore 3 which at one end terminates in an outlet port 4 and which at the other end is adapted to receive a metering valve member 5 which, as shown, is preferably in the form of a solid cylindrical plunger. Said valve member 5, at its inner end, is formed with peripheral V-shape axially extending grooves 6 and is sealed in bore 3 as by means of the O-ring 7 or like packing ring.

Intersecting the bore 3 between its ends is an inlet port 8 and as apparent the flow capacity through the valve body 2 will be determined by the axial setting of the valve member 5. As shown, the metering slots or grooves 6 in the valve member 5 are circumferentially wider and radially deeper toward the left end, whereby the flow passages defined thereby at the intersection of the inlet 8 and bore 3 become progressively larger and smaller as the valve member is adjusted toward the right and left respectively, from the position shown and, of course, flow of fluid through the valve 1 will be substantially closed when the unslotted cylindrical portion of the valve member is at the left side of the intersection of the inlet port 8 and the bore 3.

Figure 1:
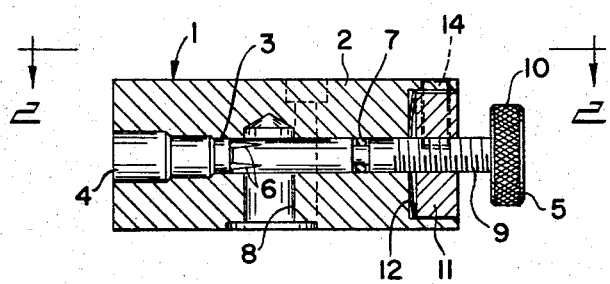
FIG. 1 is a central longitudinal cross-section view along line 1—1, FIG. 2 of a precision metering valve assembly employing the present locking device for retaining the screw threaded valve member in a preset position.
Figure 3:
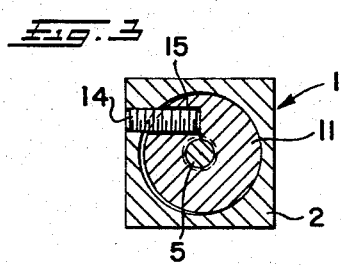
FIG. 3 is a transverse cross-section view taken substantially along the line 3—3, FIG. 2.

The valve member 5 has a threaded outer portion 9 to which is affixed the knob 10 by which it may be readily turned to preset position. The threaded portion 9 of the valve member 5 has threaded engagement with the nut 11 which fits with slight clearance in a counterbore in the end of the valve body 2, there being interposed between the nut 11 and the bottom of the counterbore a wavy spring washer 12 or the like which constantly tends to press the nut 11 toward the right as viewed in FIG. 1.

Screwed into the body 2 is a lock screw 14 which extends into a tangential cylindrical recess 15 in the nut 11 and when the inner end of the lock screw 14 is away from the bottom of the recess 15 in unlocking position, the spring washer 12 maintains the nut 11 in its outermost axial position to take up any looseness in the threads of the lock screw 14 and body 2, and between the side wall of recess 15 and the lock screw 14. In this position of the lock screw 14, the valve member 5 may be readily turned and thus axially adjusted to provide desired metering of fluid flow through the metering slots 6. When the valve member 5 has been set at the desired position, all that it is necessary to do is to tighten the lock screw 14 until its inner end bears tightly against the bottom of the recess 15 in the nut 11. This action securely locks the valve member 5 against turning. Since a lateral force is applied on the nut 11 and valve member 5 to frictionally lock the latter against rotation, the axial setting of the valve member 5 is not disturbed by the locking device constituting the present invention. It is to be noted that by reason of the disposition of the lock screw 14 and recess 15, there will be a binding action of the sidewall of the recess 15 on the lock screw 14, thus to frictionally lock the latter against loosening inadvertently or by vibration.

As aforesaid there is preferably a very slight clearance of the body 2 around the nut 11 so as to insure firm binding action between the valve member 5 and the wall of bore 3 when the lock screw 14 bears laterally against the nut 11. This clearance has been exaggerated in the drawing for purpose of illustration. The valve member 5 is a close slide fit in the bore 3 and therefore there will be only very slight lateral shifting of the nut 11 and valve member 5 when the lock screw 14 is tightened. Similarly, the lock screw 14 fits fairly closely in recess 15 to achieve the desired binding action for locking said lock screw 14 from inadvertent loosening.

Other modes of applying the principle of the invention may be employed, change being made as regards the details described, provided the features stated in any of the following claims, or the equivalent of such, be employed.

We therefore particularly point out and distinctly claim as our invention:

1. A locking device comprising a nut; a screw having threaded engagement with said nut; a body having a bore telescopically receiving an end portion of said screw for axial adjustment in said bore upon turning of said screw in said nut; and lock means in said body bearing laterally on said nut thereby to frictionally lock said screw against turning with respect to said body and said nut.

2. The device of claim 1 wherein said lock means comprises a lock screw having threaded engagement with said body.

3. The device of claim 2 wherein said nut has a peripheral recess therein in which an end portion of said lock screw is disposed when it bears laterally on said nut.

4. The device of claim 3 wherein said nut is locked against rotation with respect to said body by a side wall of said recess extending alongside said lock screw.

5. The device of claim 3 wherein said recess is cylindrical and of substantially the same diameter as the end portion of said lock screw and extends tangentially into said nut whereby, when said lock screw bears against the bottom of said recess, the side wall of said recess is urged into binding engagement with said lock screw thus to frictionally lock the latter against inadvertent loosening.

6. A locking device comprising a nut; a screw having threaded engagement with said nut; a body having a bore telescopically receiving an end portion of said screw for axial adjustment in said bore upon turning of said screw in said nut; said lock means and nut having axially and circumferentially adjacent surfaces to hold the latter against axial movement and rotation with respect to said body.

7. The locking device of claim 6 wherein spring means between said body and said nut holds said axially adjacent surfaces in engagement to retain said screw in axially adjusted position in said body.

8. A locking device for a metering valve and the like comprising a valve body having a bore leading to a fluid passage; a metering screw axially adjustable in said bore and having an end portion extending into said fluid passage to vary the flow capacity of said passage; a nut having threaded engagement with said metering screw; and lock means in said body bearing laterally on said nut thereby to frictionally lock said metering screw against turning with respect to said body and said nut; said lock means being axially and circumferentially interfitted with said nut to hold the latter against rotation and axial movement with respect to said body.

9. The locking device of claim 8 wherein spring means between said body and said nut urges the latter axially into engagement with said lock means whereby locking of said metering screw is accomplished without disturbing the axial position of adjustment of said metering screw in said body.

10. The locking device of claim 8 wherein said lock means comprises a lock screw having threaded engagement with said body and having an end portion that extends into a cylindrical recess in the periphery of said nut.

11. The locking device of claim 10 wherein the axes of said lock screw and recess are non-radial so as to effect binding engagement between the wall of said recess and said end portion of said lock screw.

References Cited by the Examiner
UNITED STATES PATENTS

| | | | |
|---|---|---|---|
| 986,539 | 3/1911 | Battin | 151—68 |
| 1,111,732 | 9/1914 | Breault | 151—70 |
| 2,739,830 | 3/1956 | Firth | 151—70 |

M. CARY NELSON, *Primary Examiner.*

R. C. MILLER, *Examiner.*